F. L. FRAIZER.
TRANSMISSION GEARING FOR AUTOMOBILES.
APPLICATION FILED DEC. 2, 1913.
1,191,956.
Patented July 25, 1916.
2 SHEETS—SHEET 1.
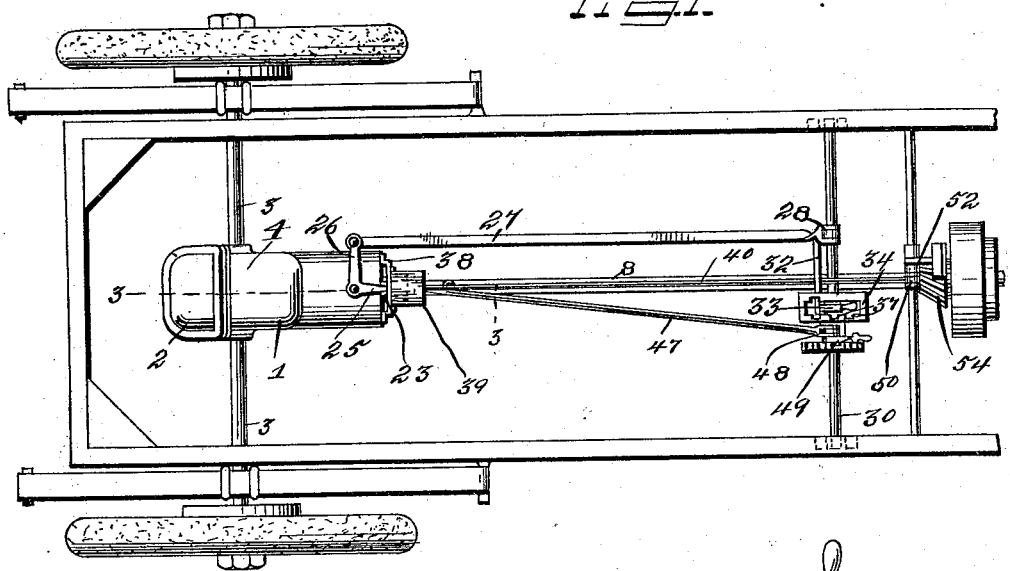
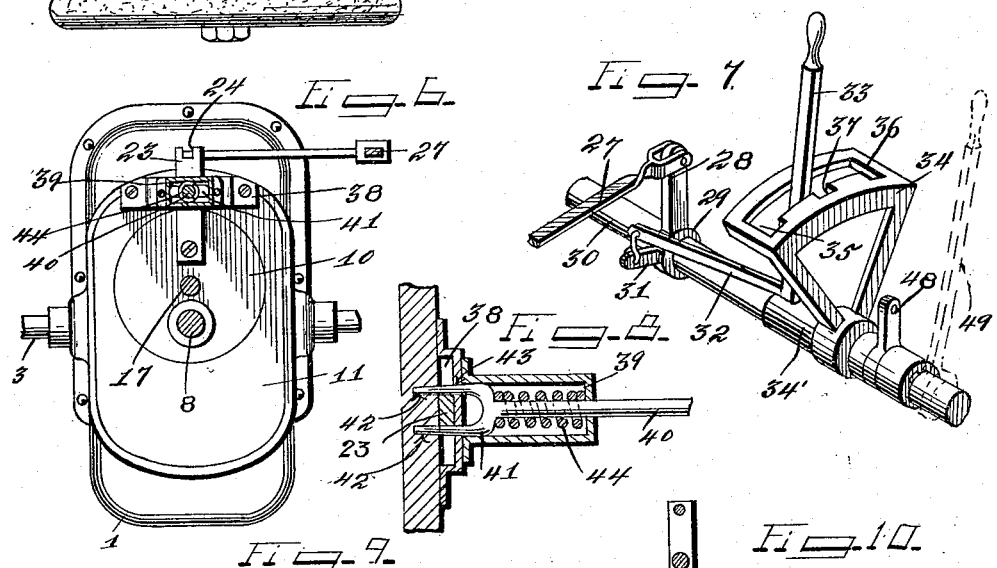
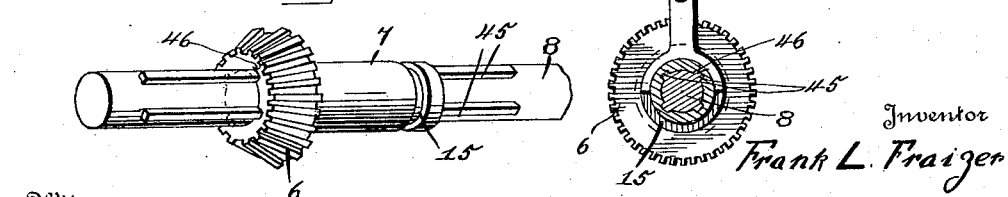
Witnesses
Inventor
Frank L. Fraizer
By
his Attorney

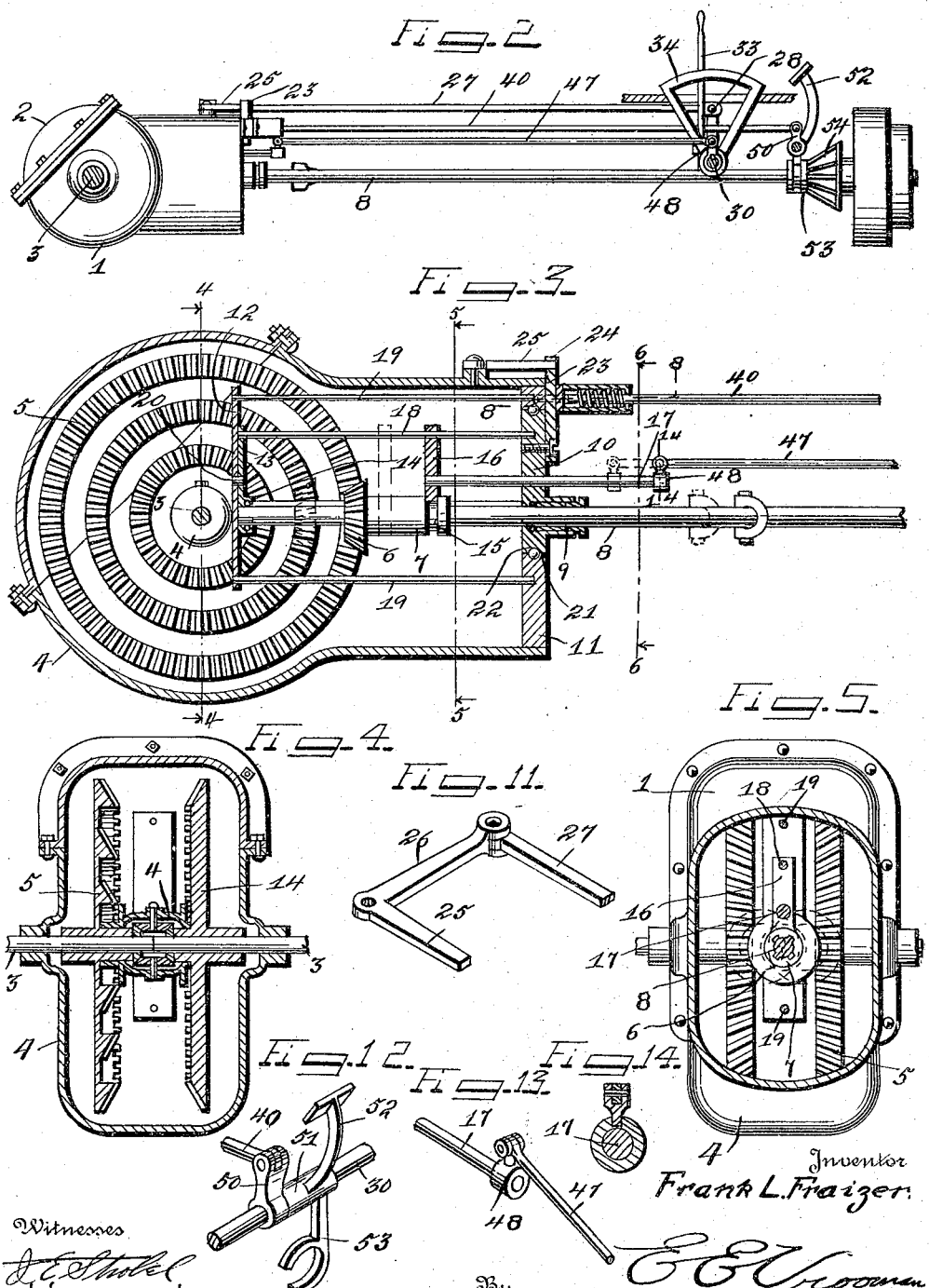

UNITED STATES PATENT OFFICE.

FRANK L. FRAIZER, OF TROY, OHIO.

TRANSMISSION-GEARING FOR AUTOMOBILES.

1,191,956.  Specification of Letters Patent.  Patented July 25, 1916.

Application filed December 2, 1913. Serial No. 804,235.

*To all whom it may concern:*

Be it known that I, FRANK L. FRAIZER, a citizen of the United States of America, residing at Troy, in the county of Miami and State of Ohio, have invented certain new and useful Improvements in Transmission-Gearing for Automobiles, of which the following is a specification, reference being had therein to the accompanying drawing.

This invention relates to transmission gearing for automobiles and the like, and has for its object the production of an efficient means for changing the speed of the driving gear.

Other objects of the present invention will appear throughout the following specification and claims.

In the accompanying drawings:—Figure 1 is a top plan view of the transmission device applied to an automobile. Fig. 2 is a side elevation of the structure illustrated in Fig. 1. Fig. 3 is a section taken on line 3—3, of Fig. 1. Fig. 4 is a section taken on line 4—4, of Fig. 3. Fig. 5 is a section taken on line 5—5, of Fig. 3. Fig. 6 is a section taken on line 6—6, of Fig. 3. Fig. 7 is a detail perspective of the gear shifting device. Fig. 8 is an enlarged section taken on line 8—8 of Fig. 3. Fig. 9 is a perspective view of the shaft and driving gear carried thereby. Fig. 10 is a transverse sectional view through the shaft and sleeve carrying the driving gear illustrated in Fig. 9 showing the clutch member applied thereto. Fig. 11 is a detail perspective of the lever for rotating the eccentric. Fig. 12 is a perspective view of the foot treadle for releasing the clutch from the driving shaft. Fig. 13 is a detail perspective of the connection of the two rods for moving the main driving gear upon the main driving shaft. Fig. 14 is a vertical section through the joint of the two rods illustrated in Fig. 13.

By referring to the drawings it will be seen that 1 designates the transmission mechanism casing which is provided with a removable cap 2 to facilitate access to the interior thereof. The rear axles 3 are carried by the transmission mechanism casing 1 and upon these axles is mounted a casing 4 which casing holds the respective drive gears in their correct spaced relation. A forward master driving gear 5 is mounted upon the shaft 3, which is formed in two sections as illustrated in Fig. 4, and this forward driving gear is provided with a plurality of rows of teeth for receiving the main driving gear 6. The main driving gear 6 is carried by the sleeve 7 and this sleeve is slidably mounted upon a main driving shaft 8, which main driving shaft 8 is journaled in a bearing 9, carried by the eccentric plate 10 which eccentric plate is rotatably mounted upon the end plate 11. The inner end of the main driving shaft 8 is engaged by means of an end plate 12 which plate 12 carries a bearing plate 13 having a ball-bearing portion 14 for receiving the inner end of the main driving shaft 8. The plate 12 constitutes one end of a swinging frame adapted to carry the main driving gear for the purpose of swinging the main gear from engagement with the forward driving gear 5 and into engagement with the backward or rearward driving master gear 14.

A sleeve 7 is provided with a circumferential groove 15 in which groove fits a shifting bar 16, which shifting bar is carried by one end of the shifting rod 17. The shifting bar 16 is also slidably mounted upon a supporting rod 18, which supporting rod 18 has its forward end securely fastened within the eccentric 10. The plate 12 is supported upon two rods 19, which rods 19 are secured to the front plate 11 and at their rear ends are secured to the plate 12. The journal plate 13 is pivotally mounted upon the plate 12 by means of a pivot pin 20 as is clearly illustrated in Fig. 3.

The eccentric 10 as above stated is rotatably mounted within the aperture 21 of the plate 11, and within this aperture are placed a plurality of ball-bearings 22 for facilitating the rotation of the eccentric within the aperture 21. An eccentric lever 23 is keyed to the eccentric 10 and is provided with an upper end 24, which upper end is engaged by the forward projecting finger 25 of the bell crank lever 26. This bell crank lever 26 is connected to a lever rod 27, which lever rod is in turn connected to a finger 28 carried by a collar 29 mounted upon a shifting shaft 30. The collar 29 also carries a projecting finger 31, which finger 31 is connected to an integral arm 32 of the operating lever 33. This operating lever 33 is mounted upon a loosely mounted collar 34' and is adapted to swing the finger or arm 28 so as to draw upon the lever 27 and move the bell crank lever 26 for the purpose of moving the eccentric 10, thereby drawing the main driving gear 6 out of engagement with one of the rows of teeth formed upon the forward driving gear 5. A quadrant 34 is carried by the shifting shaft, and the lever 33 extends through the quadrant 34 and is adapted to engage either the forward notch 35, the rearward notch 36, or the center notch 37. It should be understood that the quadrant 34 is anchored upon the floor of the automobile in the usual manner so as to prevent the same from rotating upon the shaft 30. By engaging the notch 36 the main driving gear 6 will be thrown into engagement with the gear 5. When the lever 33 engages one of the notches 35, the gear 6 will be thrown into engagement with either the rearward or forward driving gear 14. When the lever 33 is thrown into engagement with the notch 37 the gear 6 will be neutral and not engage either of the gears 5 or 14.

The eccentric lever 23 works through a band 38, which band 38 carries a housing 39 within which housing 39 works a yoke rod 40. The yoke rod 40 is provided with a forked inner end 41, which forked inner end 41 is adapted to engage the apertures 42 formed in the head 11 to hold the eccentric 10 in a set position and prevent the accidental rotation thereof. The fork 41 passes through the apertures 43 formed in the band 38 as clearly illustrated in Fig. 8. A coil spring 44 is mounted upon the yoke rod 40 and is placed within the casing 39 for the purpose of exerting an inward pressure upon the forked end 41 of the yoke rod 40 and normally hold the same in a locked position.

The sleeve 7 is slidably mounted upon the main driving shaft 8, which main driving shaft 8 is provided with a plurality of longitudinally extending tongues 45, and these tongues 45 work in the longitudinally extending grooves 46 formed in the sleeve 7. An operating rod 47 is connected to the rod 17 by means of a pivot connection 48 as is illustrated clearly in Figs. 13 and 14, and by moving the rod 47 longitudinally, the gear 6 may be thrown into and out of engagement with the desired transmission teeth formed in the gear 5 for varying the speed of the axle 3 which is driven by means of the gear 5. This rod 47, therefore, may move longitudinally by means of the arm 48 which is mounted upon the shifting shaft 30 and is operated by means of the usual operating lever 49 shown in dotted lines in Fig. 7. For the purpose of moving the eccentric 10 or rather unlocking the same for the desired movement, the yoke rod 40 is connected to a finger 50 carried by the sleeve 51, which sleeve 51 is loosely mounted upon the shaft 30. A foot treadle or foot lever 52 is carried by the sleeve 51 and this sleeve also carries a clutch finger 53, which clutch finger engages the driving clutch 54 for the purpose of throwing the driving clutch out of driving engagement with the driving shaft 8 when the yoke rod 47 is moved outwardly for causing the fork 41 of the rod 47 to clear the space between the head 11 and the band 38 for the purpose of allowing the eccentric 10 to be swung and move the gear 6 out of engagement with the gear 5. In this way it will be seen that the main driving shaft 8 will not be driven when it is being shifted, as the driving clutch 54 will be thrown out of engagement as soon as the eccentric is allowed to rotate upon the head 11.

From the foregoing description it will be seen that a very simple and efficient device has been produced for the purpose of changing or varying the speed of a transmission device, and that the usual difficulty of shifting the gears for changing the speed of the transmission has been obviated.

It will be seen further that a direct drive will be obtained from all three speeds of the transmission device.

By means of the present device it will be further understood that only the minimum amount of oil is necessary owing to the peculiar construction of the device as set forth.

The operation of the device above described is as follows: When the clutch 54 is released by means of the foot lever 52, the rod 40 will be shifted, which rod 40 is connected to the foot lever 52. By shifting the rod 40 as above indicated, the fork 41 will be withdrawn from the arm 23 thereby permitting the arm 23 to be freely swung to occupy any one of its three positions corresponding to forward, neutral and reverse. When the arm 23 is in a neutral position, the gear 6 will be free to be slid longitudinally of its rod which is done by means of shifting the lever 49. As the lever 49 is operated, the rod 47 is moved in the desired direction, thereby moving the shifting bar 16 and consequently shifting the sleeve 7 which carries the driving gear 6. After the gear 6 is slid it is brought into engagement with the selected gear on the driving shaft, by slightly rotating the eccentric 10 and the framework carried thereby, which has the shaft 8 eccentrically mounted therein, thereby bringing the driving and driven gears into mesh. The eccentric mounting of the shaft 8 is given the desired movement by the lever mechanism comprising the arm 23, bell crank 25, link 27, and finger 28, collar 29, finger 31, arm 32 and operating lever 33. The correct position will be indicated by the engagement of the lever 33 in one of the notches in the quadrant. The clutch 54 is now engaged and at the same time the fork 41 is returned to a normal position and locks the arm 23 and the eccentric 10 in position. It should be understood that the eccentric 10 may be positively held in three different positions by means of the strap 38 and the locking fork 41, corresponding to the forward, neutral and reverse positions. In order to shift the eccentric 10 it is, of course, necessary to move the fork 41 longitudinally which is done by means of the rod 40 which is connected to the clutch operating lever 52.

Having thus described the invention what is claimed as new, is:—

1. A transmission device comprising a casing, a master gear provided with a plurality of different size rows of gear teeth for producing a variable speed transmission gear, a main driving shaft, a slidably mounted driving gear mounted thereon, a driven member, means for moving said driving gear longitudinally upon said shaft, an eccentric plate positioned upon said casing, a frame carried within said casing, a journal plate carried by said casing and receiving the inner end of said main driving shaft, an eccentric lever secured to said eccentric, a fork rod, a guiding band, said eccentric lever extending and working through said guiding band, said fork rod adapted to straddle said eccentric lever, a spring engaging said fork rod for normally exerting an inward pressure thereon, said casing provided with a plurality of apertures for receiving the ends of said fork rod, said spring holding the inner ends of said fork rod within said sockets formed within said casing for preventing the operation of said eccentric without first removing said fork rod from engagement with said eccentric lever, and means for swinging said eccentric lever.

2. A transmission device comprising a casing, a variable speed transmission gear positioned therein, a backward drive master gear positioned within said casing, a main driving shaft, a slidably mounted driving gear working thereon, a driven member, a frame supporting the rear end of said main driving shaft, an eccentric carried by the front end of said casing and adapted to swing said main driving gear laterally within said casing, an eccentric lever carried by said eccentric, a bell crank lever engaging said eccentric lever, a link rod engaging said bell crank, a loosely mounted collar provided with radiating arms, said link rod connected to one of said radiating arms, an operating lever provided with a projecting arm engaging the other of said radiating arms of said collar for moving said link rod longitudinally and rotating said eccentric, means for locking said eccentric against operation, and a quadrant adapted to be engaged by said operating lever for indicating the different speeds of travel.

3. A transmission device comprising a master gear provided with a plurality of different size rows of gear teeth for producing a variable speed transmission gear, a main driving shaft, a slidably mounted driving gear mounted thereon, a driven member, means for moving said driving gear longitudinally upon said shaft, an eccentric plate, said driving shaft extending through said eccentric plate, means for supporting the inner end of said driving shaft and permitting a slight lateral swing of said shaft as said eccentric plate is rotated, means for rotating said eccentric plate, and means for locking said eccentric plate in a plurality of adjusted positions.

4. A transmission device comprising a variable speed transmission gear, a main driving shaft, a slidably mounted driving gear mounted thereon, a driven member, means for moving said driving gear longitudinally upon said shaft, means engaging said driving shaft and capable of moving said driving shaft laterally, means for supporting the inner end of said driving shaft and permitting a slight lateral swing of said shaft as said last mentioned means is operated, and means coöperating with said driving shaft for locking the same in a plurality of adjusted positions.

In testimony whereof I hereunto affix my signature in presence of two witnesses.

FRANK L. FRAIZER.

Witnesses:
  J. H. STEWART,
  C. F. FAUST.

Copies of this patent may be obtained for five cents each, by addressing the "Commissioner of Patents, Washington, D. C."